(12) United States Patent
Iseda et al.

(10) Patent No.: US 9,153,348 B2
(45) Date of Patent: Oct. 6, 2015

(54) DOUBLE-WALLED TUBE WITH INTERFACE GAP AND PRODUCTION METHOD THEREFOR

(75) Inventors: Atsuro Iseda, Tokyo (JP); Takashi Nakashima, Tokyo (JP); Tetsuo Yokoyama, Tokyo (JP); Tadashi Kawakami, Tokyo (JP); Takuya Hanada, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 412 days.

(21) Appl. No.: 13/701,862

(22) PCT Filed: May 2, 2011

(86) PCT No.: PCT/JP2011/002524
§ 371 (c)(1),
(2), (4) Date: Dec. 4, 2012

(87) PCT Pub. No.: WO2011/151971
PCT Pub. Date: Dec. 8, 2011

(65) Prior Publication Data
US 2013/0070889 A1    Mar. 21, 2013

(30) Foreign Application Priority Data

Jun. 4, 2010   (JP) .................................. 2010-128945

(51) Int. Cl.
*B21C 37/06*   (2006.01)
*F28D 7/10*    (2006.01)
(Continued)

(52) U.S. Cl.
CPC . *G21C 15/04* (2013.01); *B21C 1/00* (2013.01); *B21C 37/154* (2013.01); *B21D 19/00* (2013.01);
(Continued)

(58) Field of Classification Search
CPC ..... F28F 1/003; F28F 2255/00; F28F 21/082; F28F 21/02; F11B 1/066; G28D 7/10; G28D 7/106; G21C 15/02; G21C 12/04; G21C 12/06; B21C 37/154; B21C 1/00; B21C 1/22; B21C 1/003; B23P 15/26; B21D 53/02; B21D 19/00; Y10T 29/49925; Y10T 29/49927; F16L 9/18; F28D 7/106; F22B 1/066

See application file for complete search history.

(56) References Cited

U.S. PATENT DOCUMENTS 3,123,133 A * 3/1964 Pels et al. ....................... 165/178
3,735,475 A * 5/1973 Marriott ....................... 29/455.1
(Continued)

FOREIGN PATENT DOCUMENTS

JP    57-120002    7/1981
JP    58-041611    3/1983
(Continued)

OTHER PUBLICATIONS

J. Kubota et al., "Research and ... Breeder Reactor", Toshiba Review, vol. 47, No. 1, 1992, pp. 75-78.
(Continued)

*Primary Examiner* — Jason L Vaughan
(74) *Attorney, Agent, or Firm* — Clark & Brody

(57) ABSTRACT

After an inner wall tube, made of steel or alloy containing not less than 2% of Cr, whose outer surface thereof is machined and/or ground to a thickness of 0.1 mm or more including the scale layer, is inserted into an outer wall tube, made of ferritic steel containing not less than 2% of Cr, in which an oxide scale layer containing Cr and having a thickness of 10 to 30 μm is formed in the inner surface thereof, cold working at an outside diameter reduction rate of 5 to 30% is performed. Similarly cold worked after an inner wall tube having an oxide scale layer on the outer surface thereof, is inserted into an outer wall tube whose inner surface is machined and ground. A double-walled tube made has a uniform gap and an excellent thermal conductivity, and is suitable as materials for SG tubes of future FBR.

10 Claims, 1 Drawing Sheet

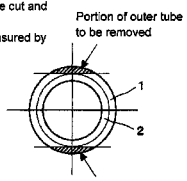

Interfacial Pressure Measurement Of Inner And Outer Tubes
(1) A strain gauge is bonded to the inner surface of the double-walled tube.
(2) Opposite two areas of the portions of outer tube are cut and removed.
(3) Strain is measured, and interfacial pressure is measured by the following formula.

$$\sigma_c = \frac{E}{1-\mu^2} \times (\varepsilon_c + \mu \varepsilon_a)$$

$$P = \frac{(b^2 - a^2)}{2b^2} \times \sigma_c$$

Where,
P(MPa)  : Interfacial pressure of interface
a(mm)   : Inner diameter of internal tube
b(mm)   : Diameter of mating surface (Outer diameter of inner tube)
σc(Mpa) : Stress (Circumferential direction)
E(GPa)  : Young's modulus 216
μ(-)    : Poisson ratio 0.25
$\varepsilon_c$ : Strain (Circumferential direction)
$\varepsilon_a$ : Strain (Axial direction)

Portion of outer tube to be removed
Portion of outer tube to be removed

(51) Int. Cl.
*G21C 15/04* (2006.01)
*F28F 1/00* (2006.01)
*F22B 1/06* (2006.01)
*B21C 37/15* (2006.01)
*F16L 9/18* (2006.01)
*B21D 19/00* (2006.01)
*F16L 9/02* (2006.01)
*B21C 1/00* (2006.01)
*B21C 1/22* (2006.01)
*F28F 21/08* (2006.01)
*F28F 1/02* (2006.01)

(52) U.S. Cl.
CPC . *F16L 9/18* (2013.01); *F22B 1/066* (2013.01); *F28D 7/106* (2013.01); *F28F 1/003* (2013.01); *B21C 1/003* (2013.01); *B21C 1/22* (2013.01); *F28F 1/02* (2013.01); *F28F 21/082* (2013.01); *F28F 2255/00* (2013.01); *Y10T 29/49925* (2015.01); *Y10T 29/49927* (2015.01)

(56) References Cited

U.S. PATENT DOCUMENTS

| | | | | |
|---|---|---|---|---|
| 3,863,328 A | * | 2/1975 | Arntz | 29/516 |
| 4,125,924 A | * | 11/1978 | Goetze et al. | 29/895.21 |
| 4,470,188 A | * | 9/1984 | Holbrook et al. | 29/445 |
| 4,694,864 A | * | 9/1987 | Libin | 138/113 |
| 4,723,602 A | * | 2/1988 | Huigen et al. | 165/180 |
| 4,744,412 A | * | 5/1988 | Kim et al. | 165/70 |
| 4,784,311 A | * | 11/1988 | Sugao | 228/131 |
| 6,192,583 B1 | * | 2/2001 | Roffelsen | 29/890.036 |
| 6,926,069 B1 | * | 8/2005 | Roffelsen | 165/70 |
| 7,596,848 B2 | * | 10/2009 | Urech et al. | 29/516 |
| 2013/0205861 A1 | * | 8/2013 | Hanada et al. | 72/274 |

FOREIGN PATENT DOCUMENTS

| | | |
|---|---|---|
| JP | 63-252614 | 10/1988 |
| JP | 64-017806 | 1/1989 |
| JP | 01-193595 | 8/1989 |
| JP | 03-234314 | 10/1991 |
| JP | 2002-030315 | 1/2002 |

OTHER PUBLICATIONS

Kenichi Kobayashi, "Grooved and . . . Wall Tubing", Sumitomo Metal, vol. 40, No. 4, Oct. 1988, pp. 112-114.

* cited by examiner

Interfacial Pressure Measurement Of Inner And Outer Tubes (1) A strain gauge is bonded to the inner surface of the double-walled tube.
(2) Opposite two areas of the portions of outer tube are cut and removed.
(3) Strain is measured, and interfacial pressure is measured by the following formula.

$$\sigma_c = \frac{E}{1-\mu^2} \times (\varepsilon_c + \mu\, \varepsilon_a)$$

$$P = \frac{(b^2 - a^2)}{2b^2} \times \sigma_c$$

Where,
P(MPa)   : Interfacial pressure of interface
a(mm)    : Inner diameter of internal tube
b(mm)    : Diameter of mating surface
           (Outer diameter of inner tube)
$\sigma$c(Mpa) : Stress (Circumferential direction)
E(GPa)   : Young's modulus 216
$\mu$(-)    : Poisson ratio 0.25
$\varepsilon_c$      : Strain (Circumferential direction)
$\varepsilon_a$      : Strain (Axial direction)

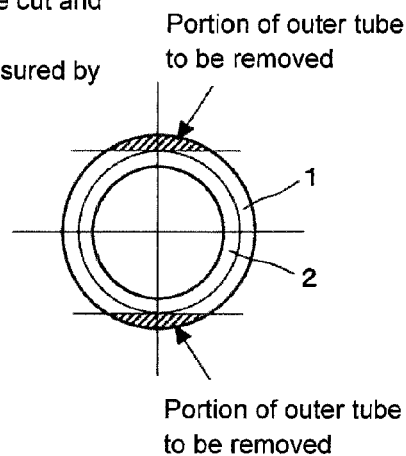

Portion of outer tube to be removed

Portion of outer tube to be removed

DOUBLE-WALLED TUBE WITH INTERFACE GAP AND PRODUCTION METHOD THEREFOR

TECHNICAL FIELD

The present invention relates to a method for producing a double-walled tube with an interface gap, and a double-walled tube produced with this method, wherein the double-walled tube is a type of heat-resistant and pressure-resistant tube which is used under high-temperature environments such as boilers for thermal power generation plants, chemical industries, nuclear power plants, and next-generation fast breeder reactors, and which requires heat exchange between inside and outside of the tube, and wherein the double-walled tube has an appropriate gap and yet a pressure bonding characteristic between the inner surface of outer wall tube and the outer surface of inner wall tube.

Unless otherwise stated, the definitions of the terms in the present description are as follows.

A "double-walled tube with an interface gap" is a double-walled tube in which metal surfaces of the inner surface of outer wall tube and the outer surface of inner wall tube are neither mechanically nor metallurgically bonded to each other (that is, there is no metallic bond between relevant metal surfaces, and there is a slight interface gap therebetween), and which further has an appropriate pressure bonding characteristic. It is noted that the above described "pressure bonding characteristic" refers to the resistance to detachment and separation between the outer wall and inner wall tubes in a double-walled tube which is obtained by inserting the inner wall tube into the outer wall tube and applying pressure bonding to them by cold working.

"Through-wall leakage" refers to a leakage of the fluid that passes inside the double-walled tube as a result of cracking which occurs either in the outer wall tube or the inner wall tube and has developed and penetrated through the double-walls of the tube.

"Percent %" represents the mass percentage (mass %) of each element contained in a product such as a double-walled tube.

BACKGROUND ART

Tube materials for steel tubes to be used under high-temperature environments such as boilers for thermal power generation plants, chemical industries, nuclear power plants, and next-generation fast breeder reactors are required to have excellent strength and corrosion resistance at high temperatures. Among them, a double-walled tube which is configured such that one of the walls is made of a material having an excellent corrosion resistance and the other is made of a material having excellent high-temperature strength is used as needed.

For example, Patent Literature 1 describes a double-walled tube formed by hot rolling a multi-layer billet in which alloy powder containing Cr and Ni as principal elements is packed on the outer surface of a billet made of Fe—Ni—Cr austenitic heat-resistant steel with a Cr content of not more than 30%. Further, Patent Literature 2 describes a double-walled tube in which one of the walls is made up of an austenitic stainless steel tube containing not less than 30% of Cr, and the other is made up of an austenitic stainless steel tube containing not less than 25% of Cr.

These double-walled tubes are of a type that is free of an interface gap, in which tubes of dissimilar metals having different properties, such as a corrosion resistance material and a high-strength material, are combined and the outer wall tube and the inner wall tube are physically or metallurgically bonded to each other (that is, the inner surface of outer tube and the outer surface of inner tube are brought into contact via metal surfaces, or in a metallic bond to each other).

However, since in a metallurgically bonded double-walled tube without the gap, the metal surfaces of the outer wall tube and the inner wall tube are physically or metallurgically bonded to each other, and it is not possible to prevent a through-wall leakage (a leakage which occurs as a result of cracking propagating through the double-walled tube) which can occur, even if in a worst case scenario, in a heat transfer tube (double-walled tube) in which liquid Na as coolant is circulated, for example, in a steam generator (SG) of a fast breeder reactor (hereafter referred to as "FBR").

If in any chance a through-wall leakage occurs in a double-walled tube to be used in a steam generator tube of a next-generation fast breeder reactor (FBR), reaction and explosion will occur as the result of contact between liquid Na and water (vapor), which is very dangerous. Therefore, the prevention of through-wall leakage is the most important issue in a fast breeder reactor (FBR).

In contrast, there has been developed a double-walled tube in which metal surfaces are not physically or metallurgically bonded to each other and the interface gap is provided therebetween. A major feature of the gap of a double-walled tube is that even if cracking occurs either in the outer wall tube or the inner wall tube, the gap will deter the propagation of the cracking, thereby preventing an immediate occurrence of a through-wall leakage. Further, there has been developed a technique in which an inert gas such as helium is flowed by utilizing the interface gap of the double-walled tube, and even if, by any chance, either of the inner wall tube or the outer wall tube fails, the failure is promptly detected, thereby preventing a through-wall leakage accident.

For example, Patent Literature 1 proposes a double-walled tube including a braided mesh wire, in which a braided mesh wire is inserted between the inner wall and outer wall tubes, the braided mesh wire being formed by bundling and weaving an element wire (100 µm) made of the same material as that of the tube. By allowing inert gas such as helium to flow through the interface gap provided in the double-walled tube, it is possible to promptly detect the fracture of the inner wall tube or the outer wall tube thereby preventing a through-wall leakage.

Further, Non Patent Literature 2 describes a double-walled tube with a groove(s), in which a groove processing for detecting a leakage is performed on the inner surface of the outer wall tube.

However, the production of such a double-walled tube with the interface gap according to such prior art requires the repetition of very special, intricate and elaborate processing. Thus, in addition to considerable difficulty in production, the prior art suffers from complexities thereof so that a great deal of man-hours are required and a large number of defects may generate, and therefore it is not suitable for mass production and poor in economic efficiency. Further, since there is contact between metal surfaces, there still remains a risk that cracking may propagate and a leakage going through the double-walled tube may occur. Further, it is difficult in reality to produce a longer-length double-walled tube of 35 m or so in length which is envisioned in next-generation FBRs.

As another prior art, Patent Literature 3 describes a cooling double-walled tube for a stave cooler which is installed in the inside of furnace wall of a blast furnace, and the like. This double-walled tube is produced by placing a foreign layer of oxides etc. in the interface between the inner and outer wall tubes which are made of carbon steel, and subjecting them to a drawing process. However, such a double-walled tube cannot be used for heat exchanger tubes since the oxides etc. placed in the interface circumvent and shield the heat transfer between the outer and inner wall tubes. Besides, the tube cannot be used for the above, since the tube material is limited to carbon steel, the strength standard for a high-temperature and pressure-resistant member which is used under environments of not less than 450° C. is not satisfied and corrosion resistance is also insufficient.

CITATION LIST

Patent Literature

Patent Literature 1: Japanese Patent Application Publication No. 64-17806
Patent Literature 2: Japanese Patent Application Publication No. 57-120002
Patent Literature 3: Japanese Patent Application Publication No. 2002-30315

Non Patent Literature

Non Patent Literature 1: "TOSHIBA REVIEW", Vol. 47, No. 1, (1992), PP. 75 to 78.
Non Patent Literature 2: "SUMITOMO METAL", Vol. 40, No. 4, October (1988), PP. 112 to 114.

SUMMARY OF INVENTION

Technical Problem

An object of the present invention, which has been made in view of the above described problems with a double-walled tube in which is provided with an interface gap for preventing a through-wall leakage in the contact/mating surfaces of the outer and inner wall tubes, is to provide a method for producing a double-walled tube with an interface gap, which satisfies the following conditions, and a double-walled tube with an interface gap produced with this method:

(1) To have a high-temperature strength as a high-temperature heat-resistant and pressure-resistant member;
(2) To be able to readily produce a double-walled tube having an interface gap between the inner surface of outer wall tube and the outer surface of inner wall tube without undergoing complex processes for preventing a through-wall leakage;
(3) The thermal conductivity between outside and inside of the tube is not impaired, that is, the heat transfer between the outer and inner wall tubes of the double-walled tube is not isolated, or not notably hindered;
(4) The outer and inner wall tubes of the double-walled tube have appropriate pressure bonding characteristic as a heat exchanger tube; and
(5) The double-walled tube with an interface gap can be stably produced ensuring a high quality (meaning that the gap has an appropriate spacing and least variation, that is, is uniform).

Solution to Problem

The summaries of the present invention are as follow.
(1) A method for producing a double-walled tube with an interface gap (this production method is also referred to as a "first invention"), including: preparing (a) an outer wall tube made of ferritic steel containing not less than 2% of Cr, in which an oxide scale layer containing Cr and having a thickness of 10 to 30 μm is formed on an inner surface thereof, and (b) an inner wall tube made of steel or alloy containing not less than 2% of Cr, in which the outer surface thereof is machined and/or ground by a thickness of not less than 0.1 mm including a scale layer; and, after the inner wall tube is inserted into the outer wall tube, performing cold working at an outside diameter reduction rate of 5 to 30%.

(2) A method for producing a double-walled tube (this production method is referred to as a "second invention"), including: preparing (a) an inner wall tube made of ferritic steel containing not less than 2% of Cr, in which an oxide scale layer containing Cr and having a thickness of 10 to 30 μm is formed on the outer surface thereof, and (b) an outer wall tube made of steel or alloy containing not less than 2% of Cr, in which an inner surface thereof is machined and/or ground by a thickness of not less than 0.1 mm including a scale layer; and, after the inner wall tube is inserted into the outer wall tube, performing cold working at an outside diameter reduction rate of 5 to 30%.

(3) A double-walled tube with an interface gap, wherein the gap thereof produced by the method according to the above described (1) or (2) is 10 to 100 μm including the scale layer.

(4) The double-walled tube with an interface gap according to the above described (3), wherein an interfacial pressure between the inner and outer wall tubes of the double-walled tube with the gap is 5 to 70 MPa.

(5) The double-walled tube with an interface gap according to the above described (3) or (4), wherein the double-walled tube with the gap is used for a steam generator tube of a fast breeder reactor.

Advantageous Effects of Invention

According to the double-walled tube with an interface gap of the present invention, it is possible to readily and stably produce a high-quality double-walled tube with an interface gap which has a high-temperature strength as a high-temperature heat-resistant and pressure-resistant member, and has an interface gap between the inner surface of outer wall tube and the outer surface of inner wall tube for preventing a through-wall leakage.

The double-walled tube with the gap produced by the method of the present invention has the gap with an appropriate spacing between the inner surface of outer wall tube and the outer surface of inner wall tube so that the thermal conductivity between outside and inside of the double-walled tube is not impaired, and the outer wall tube and the inner wall tube have an appropriate pressure bonding characteristic. This double-walled tube with the gap can be used as a high-temperature heat-resistant and pressure-resistant member for boilers of thermal power generation plants, chemical industries, and nuclear power, and particularly suitable for steam generator tubes of future fast breeder reactors.

BRIEF DESCRIPTION OF DRAWINGS

FIG. 1 is a diagram to illustrate the method for measuring an interfacial pressure (the Crampton method) of the interface between the inner and outer wall tubes of a double-walled tube with an interface gap.

DESCRIPTION OF EMBODIMENTS

The present inventors have repeated studies on the method for efficiently and economically producing an interface gap with an appropriate spacing to allow the prevention of a through-wall leakage in a double-walled tube, which is a significant issue of prior art. As a result, the inventors have found that producing a scale layer in advance and allowing it to remain in a ferritic steel containing not less than 2% of Cr is very effective, and that heat transfer (heat conduction of double-walled tube) between the outer and inner wall tubes is sufficiently conducted even if the scale layer remains in the contact surface between the outer and inner wall tubes. Further, it is found that machining and grinding of the outer surface or the inner surface of the relevant tube (that is, the counterpart tube) to mate with the surface where the scale layer is formed, and giving appropriate working is important when inserting the inner wall tube into the outer wall tube and finishing them into a double-walled tube.

The present invention has been made based on those findings.

As described so far, in the method for producing a double-walled tube with an interface gap according to the present invention, a first invention is a method in which an oxide scale layer is formed in the inner surface of outer wall tube, the outer surface of the inner wall tube is machined and/or ground, and after the inner wall tube is inserted into the outer wall tube, cold working is performed at a predetermined reduction rate. On the other hand, a second invention is a method in which the processings applied to the outer wall tube and the inner wall tube are inversely arranged such that an oxide scale layer is formed on the outer surface of the inner wall tube, while the inner surface of the outer wall tube is machined and/or ground, thereafter cold working is performed in a similar fashion.

The purpose of using a ferritic steel containing not less than 2% of Cr as described above for the tube in which the oxide scale layer is formed is to build an interface gap with an appropriate spacing and least variation between mating surfaces; the inner surface of outer wall tube and the outer surface of inner wall tube.

To build an interface gap with an appropriate spacing, a tight and stable scale layer is needed. Since the scale layer of carbon steel free of Cr has a large variation in thickness, is brittle and unstable, and easily exfoliates to come off during the working of the assembled tube, it is not possible to build the gap with an appropriate spacing when a double-walled tube is made. The scale layer of ferritic steel containing not less than 2% of Cr is stable and exhibits least variation, and therefore essentially needed for building the gap with an appropriate spacing. Although the upper limit of the amount of Cr is not defined, since the scale becomes less likely to beformed when the Cr content is not less than 15%, a ferritic steel having less than 13% of Cr is preferable.

On the other hand, since in an austenitic steel and Ni-based alloy, etc. other than ferritic steel, it is difficult to form a scale layer having a sufficient thickness, the tube in which a scale layer is formed is limited to be made of ferritic steel.

The reason why the thickness of the scale layer to be formed on either the inner or outer surface of the relevant tube is made to be 10 to 30 µm as described above is that if the thickness of the scale layer is less than 10 µm, there is no effect of building an interface gap between mating surfaces: the inner surface of outer wall tube and the outer surface of inner wall tube; on the other hand, if the thickness is more than 30 µm, the scale layer becomes more likely to exfoliate to come off during subsequent working, or the gap becomes too large so that the heat transfer capability between outside and inside of the product sharply deteriorates.

The scale layer is formed such as by heating during the production of each of the outer and inner wall tubes before performing the drawing work and rolling work of the double-walled tube, and a heat treatment before assembling the outer and inner wall tubes that are processed as above for a double-walled tube. The thickness of the scale layer can be adjusted by investigating in advance the relationship among the temperature and time during heating, and the thickness of scale layer for each material.

The purpose of using a thickness of not less than 0.1 mm including the scale layer for the outer surface or the inner surface of the counterpart tube which is to be mated with the surface where the scale layer is formed is machined and/or ground (hereafter, also referred to as "machining and grinding") is to build an interface gap with an appropriate spacing between mating surfaces: the inner surface of outer wall tube and the outer surface of inner wall tube, when assembling the outer and inner wall tubes for making a double-walled tube.

When a scale layer is stuck on the surface of the counterpart of the tube in which the scale layer is formed, or the surface of the relevant tube is not machined and/or ground, the gap to be built between mating surfaces: the inner surface of outer wall tube and the outer surface of inner wall tube will not have an appropriate spacing so that not only the uniformity (which means that the gap has an appropriate spacing and least variation) is impaired, but also a pressure bonding characteristic cannot be secured and the bonded interface of the resultant double-walled tube will be easily detached or separated.

Further, since there are flaws, wrinkles, carburized and/or nitrided layers, and the like on the surface of any tube at the time of production, and thus the surface is not uniform, they should be removed by performing machining and grinding to build the gap having an appropriate spacing and least variation.

Performing machining and/or grinding to a thickness of not less than 0.1 mm allows the scale layer to be removed, thereby allows for removing flaws, wrinkles, carburized and/or nitrided layers and the like on the surface of any tube at the time of production. Therefore, the thickness to be removed by machining and/or grinding is defined to be not less than 0.1 mm. The upper limit of the margin for machining and grinding is not particularly defined. This is because even if the margin for machining and grinding increases, there will be no problem in a technical sense from the viewpoint of building an interface gap with an appropriate spacing, and an excessive machining and grinding will be intrinsically restricted by the wall thickness etc. of the outer or inner wall tube.

It is preferable that the surface roughness due to machining and/or grinding is arranged to be about 0.05 to 3 µm in arithmetic mean roughness (Ra). Since coarser surface roughness (Ra) will result in a non-uniform gap built between the inner surface of outer wall tube and the outer surface of inner wall tube after they are processed into a double-walled tube, and therefore is not preferable.

After machining and/or grinding is performed, compressive residual stress caused thereby is to be left therein to obtain a double-walled tube with an excellent pressure bonding characteristic, so heat treatment etc. will not be performed.

Further, performing shotpeening processing in place of machining and grinding, or combining the both is also effective. On the other hand, performing a chemical treatment such as pickling in place of machining and grinding is not suitable since compressive residual stress on the surface is not generated, and therefore a double-walled tube with an excellent pressure bonding characteristic will not be obtained.

The purpose of using steel or alloy containing not less than 2% of Cr as described above for the counterpart tube to mate with the surface where a scale layer is formed is to ensure a high-temperature strength specified by the Standard etc. as a high-temperature heat-resistant and pressure-resistant member. Although, as described above, the tube in which a scale layer is formed is limited to be made of ferritic steel from the viewpoint of forming a tight and stable scale layer, the counterpart tube for the one having the scale layer will not be subject to such restriction, a wider variety of steels or alloys such as ferritic steels containing a higher amount of Cr, austenitic steels, Ni-based alloys may be used according to the condition of use as a high-temperature heat-resistant and pressure-resistant member.

The purpose of performing, in the first and second invention, cold working at an outside diameter reduction rate of 5 to 30% after the inner wall tube being inserted into the outer wall tube, the tubes being appropriately prepared as described above, is to easily and economically produce a double-walled tube which has an appropriate gap between the inner surface of outer tube and the outer surface of inner tube for preventing a through-wall leakage, in which thermal conductivity between outside and inside of the double-walled tube is not impaired, and further the outer wall tube and the inner wall tube have an appropriate pressure bonding characteristic.

Cold working is performed by a drawing process or a rolling process by a roll. The outside diameter reduction rate by cold working is 5 to 30%. When the outside diameter reduction rate is less than 5%, the outer wall tube and the inner wall tube are not pressure bonded. On the other hand, by working at an outside diameter reduction rate of more than 30%, the gap will become small, thereby disabling sufficient prevention of through-wall leakage. Preferably, cold working is performed at an outside diameter reduction rate of 10 to 15%. More preferable is a drawing process at an outside diameter reduction rate of 10 to 15%, which uses only a die without using a plug.

The treatment after cold working will not be particularly defined. The thus-made double-walled tube may be an as-worked product, or subjected to normalizing, tempering, annealing, solid solution heat treatment, stress-relief annealing etc. to be an end product. When there is required a double-walled tube in which interfacial pressure between the inner and outer wall tubes as an end product is high, working conditions suitable for that may be appropriately selected. Further, when placing importance on the high-temperature creep characteristic, heat treatment specified by Standards is performed on either or both of the outer and inner wall tubes.

According to the method for producing a double-walled tube with an interface gap of the present invention described above, it is possible to readily and stably produce a double-walled tube having a uniform interface gap between the inner surface of outer wall tube and the outer surface of inner wall tube without undergoing complex processes. It is also possible to produce a longer-length product of about 35 m long.

The double-walled tube with an interface gap of the present invention is a double-walled tube with the gap wherein the gap between the inner surface of outer wall tube and the outer surface of inner wall tube is 10 to 100 µm including the scale layer.

When the gap is less than 10 µm, it is not possible to sufficiently arrest the propagation of cracking that occurs in the outer wall tube or the inner wall tube, and thus the cracking will develop and the double-walled tube will become liable to through-wall fracture. On the other hand, when the gap is more than 100 µm, sufficient heat transfer between the outer and inner wall tubes cannot be ensured and the outer wall tube and the inner wall tube becomes less likely to be pressure bonded. The spacing of the gap is preferably 10 to 50 µm. More preferably, the spacing is 10 to 35 µm.

In the double-walled tube with an interface gap of the present invention, the interfacial pressure in the interface between the inner and outer tubes is preferably 5 to 70 MPa.

The interfacial pressure in the interface between the inner and outer tubes of the double-walled tube is needed to ensure a pressure bonding characteristic so that the inner and outer wall tubes will not be easily detached or separated from each other. When the interfacial pressure in the interface of the double-walled tube is less than 5 MPa, an excellent pressure bonding characteristic cannot be ensured, and when more than 70 MPa, there is a risk that the defective such as curved tube occur in the double-walled tube.

The double-walled tube with the gap of the present invention has a versatility as a heat-resistant and pressure-resistant member, and can be widely used under high-temperature environments such as boilers for thermal power generation plants, chemical industries, and nuclear power plants. In particular, it is suitable as a steam generator tube of next-generation fast breeder reactors in which the prevention of through-wall leakage is a crucial issue, and can be provided as a longer-length product of about 35 m long.

EXAMPLES

As outer and inner wall tubes for producing a double-walled tube, seamless tubes of JIS standard STBA24 (2.25Cr-1Mo) which is a conventional heat-resistant steel containing not less than 2% of Cr, ASME standard T91 (9Cr-1Mo—V—Nb), and JIS standard SUS321HTB (18Cr-10Ni—Ti) were prepared. The dimensions of respective tubes were as follows.

Outer wall tube: Outside diameter 20.4 mm, wall thickness 1.9 mm, and length 15 m Inner wall tube: Outside diameter 15.7 mm, wall thickness 1.6 mm, and length 15 m Using these seamless steel tubes, tubes in which an oxide scale is formed in advance in the inner surface or the outer surface thereof, and tubes in which the surface (inner or outer surface) thereof to be the counterpart of the aforementioned tube was machined and ground were prepared in combination of the outer and inner wall tubes as shown in Table 1.

TABLE 1

| | | Material Used | | Production Method | | |
|---|---|---|---|---|---|---|
| | Prototype No. | | Material | Scale thickness before drawing process (µm) | Machining and grinding of surface | Reduction rate of drawing of double-walled tube (%) |
| Inventive material | 1 | Outer tube | STBA24 | Inner surface: 28 | None | 8 |
| | | Inner tube | STBA24 | Outer surface: 0 | 0.2 mm | |
| | 2 | Outer tube | T91 | Inner surface: 11 | None | 15 |
| | | Inner tube | T91 | Outer surface: 0 | 0.15 mm | |

TABLE 1-continued

|  |  |  |  |  |  |  |
|---|---|---|---|---|---|---|
|  | 3 | Outer tube | T91 | Inner surface: 18 | None | 15 |
|  |  | Inner tube | T91 | Outer surface: 0 | 0.3 mm |  |
|  | 4 | Outer tube | T91 | Inner surface: 0 | 0.2 mm | 9 |
|  |  | Inner tube | STBA24 | Outer surface: 27 | None |  |
|  | 5 | Outer tube | SUS321H | Inner surface: 0 | 0.3 mm | 20 |
|  |  | Inner tube | TB T91 | Outer surface: 15 | None |  |
| Comparative material | 6 | Outer tube | STBA24 | *Inner surface: 11 | * None | 10 |
|  |  | Inner tube | STBA24 | *Outer surface: 20 | * None |  |
|  | 7 | Outer tube | T91 | *Inner surface: 5 | None | 7 |
|  |  | Inner tube | T91 | Outer surface: 0 | 0.2 mm |  |
|  | 8 | Outer tube | T91 | Inner surface: 12 | None | 15 |
|  |  | Inner tube | T91 | Outer surface: 0 | *Scale is removed by pickling |  |
|  | 9 | Outer tube | SUS321H | *Inner surface: 0 | 0.3 mm | 20 |
|  |  | Inner tube | TB T91 | *Outer surface: 0 | 0.2 mm |  |
|  | 10 | Outer tube | T91 | Inner surface: 11 | None | *3 |
|  |  | Inner tube | T91 | Outer surface: 0 | 0.15 mm |  |

Evaluation Results

|  | Spacing of gap (μm) | Pressure bonding characteristic of double-walled tube | Interfacial pressure (MPa) | Thermal conductivity of double-walled tube | Creep rupture strength |
|---|---|---|---|---|---|
| Inventive material | 25-32 | Excellent | 30 | Excellent | Comparable to single tube STBA24 |
|  | 11-20 | Excellent | 25 | Excellent | Comparable to single tube T91 |
|  | 17-26 | Excellent | 45 | Excellent | Comparable to single tube T91 |
|  | 22-32 | Excellent | 20 | Excellent | Comparable to single tube STBA24 |
|  | 17-24 | Excellent | 70 | Excellent | Above single tube T91 |
| Comparative material | 35-70 | Large gap and no sufficient pressure bonding | — | Unsuitable | — |
|  | 0-10 | Partial adhesion between metal surfaces; unsuitable | — | Excellent | — |
|  | 0-15 | Outer tube and inner tube are easily separated; unsuitable | — | Excellent | — |
|  | 0 (Adhesion) | Complete adhesion between metal surfaces; unsuitable | — | Excellent | — |
|  | 20-110 | Outer tube and inner tube are not pressure-bonded and easily separated | 0 | Unsuitable | — |

[Remarks]
A symbol "*" indicates that the value is out of the range defined according to the invention.

The oxide scale layer of the relevant tube was produced by selecting an appropriate heat treatment in advance and performing the treatment, and it was confirmed that a uniform oxide scale layer which had a good adhesiveness was produced in a thickness shown in Table 1.

The machining and grinding was performed on the outer surface of the relevant tube by using a roller type grinding machine, and was performed on the inner surface of the relevant tube by an internal grinding machine in which an effecting plug attached with a grinding paper was reciprocatingly moved in the tube, such that a predetermined roughness and the margin of grinding were ensured.

An inner wall tube was inserted into those outer wall tubes according to the combination shown in Table 1, and prototypes of double-walled tubes were fabricated by a drawing process (sinking) in which a die is used without using a plug.

Table 1 shows the outer-diameter decrease rate (shown as a "reduction rate of drawing of double-walled tube") during drawing process.

Table 1 shows evaluation results along with production conditions.

The spacing of the gap of the produced double-walled tube is shown as a range by average values which were obtained by measuring and averaging five points by optical microscopic observation at five locations in a circumferential section of tube.

The pressure bonding characteristic of double-walled tube was investigated by cutting the sample of 5 cm in length, and further divided it into halves in a longitudinal direction, and the outer wall tube and the inner wall tube were disassembled to see if they will be easily detached and separated from each other.

The interfacial pressure was evaluated by obtaining actually measured values by an interfacial pressure measurement method (the Crampton method) shown in FIG. 1.

The thermal conductivity of double-walled tube (evaluation including the heat transfer of the outer and inner wall tubes) was evaluated such that the heat transfer amount from the outer wall tube to the inner wall tube was measured by the procedure described below to determine a thermal conductivity by calculation, and the thermal conductivity was evaluated as "excellent" when the decrease in the thermal conductivity with respect to the thermal conductivity of the single tube of ASME Standard T91 is within 20% of the thermal conductivity thereof, and as "unsuitable" when the decrease was more than that.

Procedure:

1) the whole of a double-walled tube is heated by a heater to a predetermined temperature, 2) water is flowed into the inside of the tube, and the temperature of water at the entrance side and exit side is measured, and 3) the temperature difference of water corresponds to the amount of heat obtained, and assuming that the amount of heat is obtained from the tube wall, the thermal conductivity of the double-walled tube is determined.

The creep rupture strength was evaluated by performing an internal pressure creep test on prototype double-walled tubes and respective single tubes, and comparing the rupture strengths of the double-walled tubes and single tubes, respectively.

As shown in Table 1, in the inventive examples, any of gaps of double-walled tubes were uniform and had least variation, all interfacial pressures were generally within a desired range, and the pressure bonding characteristic were all excellent. The thermal conductivity as being an important property in the double-walled tube of the present invention was excellent for all of them.

Further, an internal pressure creep test was conducted on the double-walled tubes produced in the present invention to confirm that the rupture strengths of the double-walled tubes were approximately equal to the strengths of respective single tubes.

On the other hand, in the comparative examples, when a scale layer was present both in the outer and inner wall tubes (prototype No. 6), the gap of the double-walled tube increased, and its variation was large so that sufficient pressure bonding characteristic was not obtained and the thermal conductivity was unsatisfactory as well.

When the scale layer was thinner than the range defined in the present invention (prototype No. 7), the gap was as small as 0 to 10 μm, and according to a microscopic observation of the cross section of the (double-walled) tube, partial contact between the mating metal surfaces: the inner surface of outer wall tube and the outer surface of inner wall tube was detected. In this double-walled tube, it is presumed that there may be the case where the propagation of cracking cannot be arrested.

When the scale was removed by pickling (prototype No. 8) in place of machining and grinding the surface of a relevant tube, the outer wall tube and inner wall tube were not pressure-bonded, and were easily detached from each other, which was unsuitable as a double-walled tube.

Further, when both surfaces: the inner surface of inner wall tube and the outer surface of inner wall tube to mate with each other were ground (prototype No. 9), the double-walled tube was completely pressure bonded without an interface gap. This double-walled tube is unsuitable since a through-wall cracking may occur.

Further, when the reduction rate in drawing a double-walled tube was small (prototype No. 10), the spacing of the gap between the inner surface of outer wall tube and the outer surface of inner wall tube varied excessively, the outer and inner wall tubes were not pressure bonded, since they were separate from each other, and the thermal conductivity was unsuitable as well.

The investigation results described above have confirmed that applying the method for producing a double-walled tube with an interface gap of the present invention allows the production of a double-walled tube which has a uniform gap between the inner surface of outer wall tube and the outer surface of inner wall tube, and which exhibits excellent thermal conductivity between the outer and inner surfaces thereof.

INDUSTRIAL APPLICABILITY

The present invention can be utilized as a high-temperature heat-resistant and pressure-resistant member for boilers of power generation plants, chemical industries, and nuclear power, and further as the starting material of steam generator tubes of future fast breeder reactors, and can make great contributions in those industrial fields.

REFERENCE SIGNS LIST

1: Outer wall tube
2: Inner wall tube

What is claimed is:

1. A method for producing a double-walled tube with an interface gap, wherein the method comprises:

providing an outer wall tube made of ferritic steel containing not less than 2% by mass of Cr, forming on said outer wall tube an oxide scale layer containing Cr, wherein said oxide scale layer is formed on an inner surface of said outer wall tube and is formed having a thickness of 10 to 30 μm, providing an inner wall tube made of steel or a steel alloy containing not less than 2% of Cr, forming on said inner wall tube an oxide scale layer containing Cr, wherein said oxide scale layer is formed on an outer surface of said inner wall tube, grinding or machining said outer surface of said inner wall tube such that said oxide scale layer on said outer surface of said inner wall tube is of a thickness not less than 0.1 mm, and inserting said inner wall tube into said outer wall tube and after said inner wall tube has been inserted into said outer wall tube, cold working an outside diameter of said outer wall tube with said inner wall tube inserted therein at a reduction rate of 5 to 30% in order to form said double-walled tube having said interface gap between said inner wall tube and said outer wall tube.

2. The method for producing a double-walled tube of claim 1, further comprising: wherein said interface gap formed between said inner wall tube and said outer wall tube is 10 to 100 μm including said oxide scale layer.

3. The method for producing a double-walled tube of claim 2, further comprising: wherein an interfacial pressure between said inner wall tube and said outer wall tube of said double-walled tube is 5 to 70 MPa.

4. The method for producing a double-walled tube of claim 3, further comprising: wherein said double-walled tube is used as a steam generator tube of a fast breeder reactor.

5. The method for producing a double-walled tube of claim 2, further comprising: wherein said double-walled tube is used as a steam generator tube of a fast breeder reactor.

6. A method for producing a double-walled tube, wherein the method comprises:
   providing an inner wall tube made of ferritic steel containing not less than 2% by mass of Cr,
   forming on said inner wall tube in which an oxide scale layer containing Cr,
   wherein said oxide scale layer is formed on an outer surface of said inner wall tube and is formed having a thickness of 10 to 30 μm,
   providing an outer wall tube made of steel or a steel alloy containing not less than 2% by mass of Cr,
   forming on said outer wall tube an oxide scale layer containing Cr,
   wherein said oxide scale layer is formed on an inner surface of said outer wall tube,
   grinding or machining said inner surface of said outer wall tube such that said oxide scale layer on said inner surface of said outer wall tube is of a thickness not less than 0.1 mm, and
   inserting said inner wall tube into said outer tube and after said inner wall tube has been inserted into said outer wall tube, cold working an outside diameter of said outer wall tube with said inner wall tube inserted therein at a reduction rate of 5 to 30% in order to form said double-walled tube having said interface gap between said inner wall tube and said outer wall tube.

7. The method for producing a double-walled tube of claim 6, further comprising: wherein said interface gap is 10 to 100 μm including said oxide scale layer.

8. The method for producing a double-walled tube of claim 7, further comprising: wherein an interracial pressure between said inner wall tube and said outer wall tube of said double-walled tube is 5 to 70 MPa.

9. The method for producing a double-walled tube of claim 8, further comprising: wherein said double-walled tube is used as a steam generator tube of a fast breeder reactor.

10. The method for producing a double-walled tube of claim 7, further comprising: wherein said double-walled tube is used as a steam generator tube of a fast breeder reactor.

* * * * *